Sept. 9, 1958 W. F. WALKER 2,851,617

BIPOLARITY GATE

Filed March 4, 1957 2 Sheets-Sheet 1

INVENTOR
WATSON F. WALKER
BY
[signature]
ATTORNEY

Sept. 9, 1958 W. F. WALKER 2,851,617

BIPOLARITY GATE

Filed March 4, 1957 2 Sheets-Sheet 2

United States Patent Office 2,851,617

Patented Sept. 9, 1958

2,851,617

BIPOLARITY GATE

Watson F. Walker, Rochester, N. Y., assignor to General Dynamics Corporation, Rochester, N. Y., a corporation of Delaware Application March 4, 1957, Serial No. 643,689

5 Claims. (Cl. 307—149)

This invention relates to electric network signaling systems and particularly to gating means used for the separation of channels in multiplex signaling systems.

The object of the invention is to provide a gating means which will operate to pass both negative and positive signals.

The invention consists essentially of a split channel having one branch thereof acting as an output for one train of pulses and a second branch acting as an output for another train of pulses where these separate trains are transmitted on a time division multiplex channel. A gating means for the first train is connected to the second branch and by synchronous control blanks out or attenuates signals of said first train on such second branch, thereby allowing the passage over said second branch only of signals of said second train. Likewise a gating means for the second train is connected to the first branch and by synchronous control blanks out or attenuates signals of said second train on such first branch, thereby allowing the passage over said first branch only of signals of said first train.

The means employed to attenuate the signals on a branch circuit consist of a twin array of diodes and tubes, one normally offering no hindrance to positive pulses and the other normally offering no hindrance to negative pulses but both, in synchronism with the time interval for the pulses to be blanked out offering a low impedance path to pulses of both polarities to substantially drain them from the circuit.

The gating means thus consists essentially of a means to drain off from a circuit any pulses that rightfully belong in the other circuit, or put in another way, the gating means consists of a means to block transmission on a line excepting during the intervals used for the transmission of the pulses of a wanted train.

A feature of the invention is an electronic network connected to each branch of a divided circuit, each said network being controlled by means synchronized with the transmission in the other branch of said circuit. It is to be noted that this same principle is applicable to circuits carrying more than two multiplexed trains of signals, so that in general the channel is divided into as many outgoing circuits as there are trains of signals and each such circuit is controlled by means synchronized with the signals in all the other channels.

A feature of the invention is a bipolar arrangement wherein each branch of a divided circuit is normally arranged to pass both positive and negative signals and in which means is provided to blank out, nullify, short-circuit, erase, or otherwise attenuate all signals of any polarity on said branch excepting those signals constituting the trains for which the said branch is provided.

Another feature of the invention is a bipolar gating means which will operate within given limits. In accordance with the features hereinabove set forth, the gating means appears as a means to allow wanted signals to pass freely and to erase or otherwise prevent the passage of any other positive or negative signal. The removal of the bar to the passage of the wanted signals is, however, not without limitation for means is provided to impose a maximum on either a positive or a negative signal which is passed whereby the free passage of the wanted signals is limited to signals within a definite range of amplitudes.

Other features will appear hereinafter.

The drawings consist of two sheets having six figures as follows:

Figs. 1 to 5 inclusive are a set of graphs showing the operation of the means of the present invention and the results obtained thereby; and in which Fig. 1 is a representation of the multiplexed signals carried over the single incoming channel;

Figures 1, 2, 3, 4, 5:
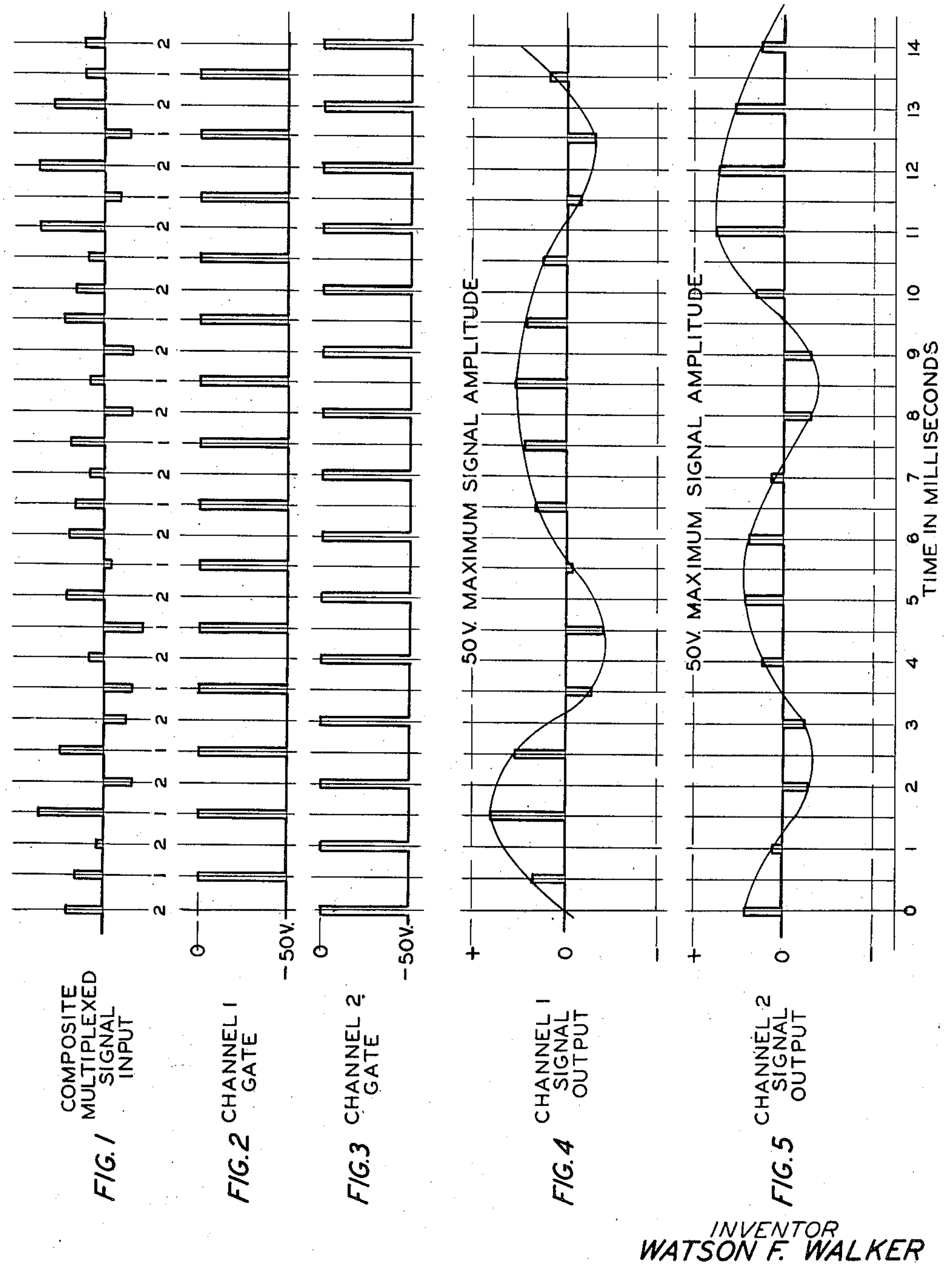
Fig. 2 is a presentation of the synchronizing pulses applied to outgoing channel 2 corresponding to the signals to be passed over outgoing channel 1.
Fig. 3 is a similar representation of the synchronizing pulses applied to outgoing channel 1 corresponding to the signals to be passed over outgoing channel 2.
Fig. 4 is a representation of the output transmitted over outgoing channel 1.
Fig. 5 is a representation of the output transmitted over outgoing channel 2.

It is believed that the operation of the device and the results obtained will be clearly apparent from the graphs, Figs. 1 to 5 inclusive. The signals shown in Fig. 1 are the multiplexed input signals where alternate pulses serve both channels. The signals shown in Fig. 4 are the channel 1 output signals and those shown in Fig. 5 are the channel 2 output signals. The signals shown in Fig. 2 are known as the channel 1 gate and are those signals applied to the channel 2 network whereas the signals shown in Fig. 3 are known as the channel 2 gate and are those applied to the channel 1 network. These gating signals are conventional and are derived from other control points not shown in a greater network of which the present separation means is a part and where the timing of such gating signals and the multiplexed signals is precisely controlled.

Figure 6:
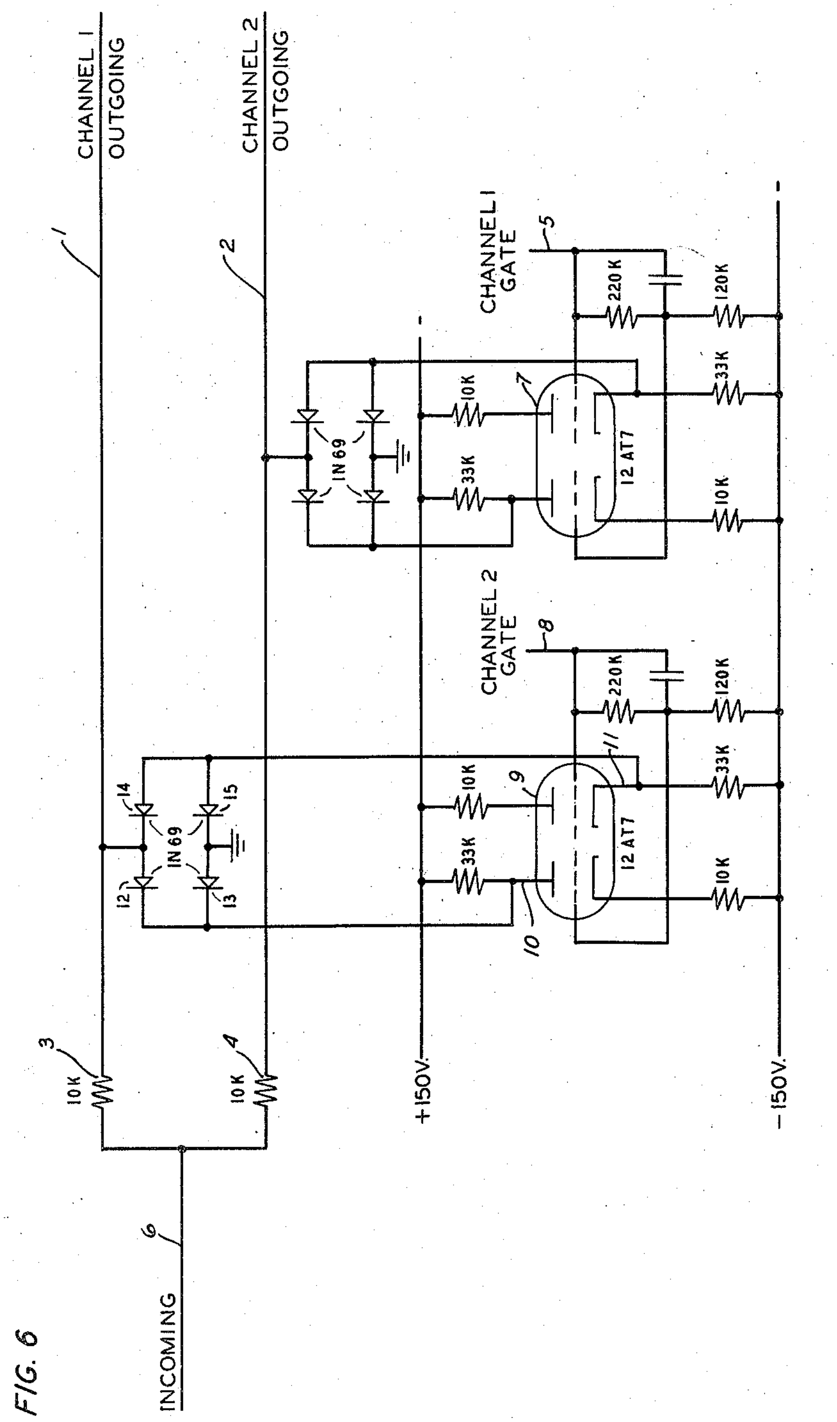
Fig. 6 is a schematic circuit diagram showing the electronic network used for the purposes of the present invention.

Looking at the circuit diagram, Fig. 6, it will be seen that the input channel 6 divides into two output channels 1 and 2, each including a resistor 3 and 4 respectively. Thus a potential spike or signal incoming over channel 6 is applied to both outgoing channel 1 and outgoing channel 2, but if it is grounded or otherwise suppressed in channel 1 it will still manifest itself as an undiminished signal in channel 2.

Since the normal state of the channel 2 gate 8 is at about a minus 50 volts, the grids of both halves of the tube 9 will be negative and both halves will be conducting lightly with the result that the anode 10 will be at about 50 volts above ground and the cathode 11 will be at about 50 volts below ground. Under these conditions all of the diodes 12 to 15 will be nonconducting so long as the input signal does not exceed 50 volts in magnitude. Consequently, the output signal on this channel 1 will follow the signals of the input terminal 6.

The gating pulse for channel 2, applied to the grids of tube 9 is a swing from —50 volts to zero and this causes both halves of the tube 9 to conduct heavily. The left hand plate 10 will drop to zero potential and will be clamped by diode 13 and the right hand cathode will rise to zero potential and will be clamped there by diode 14. In this condition diode 12 will blank out a negative pulse on channel 1 and the diode 14 will blank out a positive pulse in this channel. Since the channel 2 gate 8 is applied to the channel 1 gate tube 9 and arrives in coincidence with the channel 2 pulses on the input terminal 6, the channel 2 pulses and only the channel 2 pulses are effectively shortcircuited to ground in the channel 1 output lead. Consequently the channel 1 pulses alone appear at this outgoing terminal 1.

It is believed to be clear that the same sort of arrangement whereby the channel 1 gate 5 is connected to control the channel 2 gate tube 7 so as to limit the outgoing pulses on channel 2 to only channel 2 pulses and to obstruct the transmission of channel 1 pulses thereover will be clear.

It is lastly to be noted that during those periods when the potential on channel 2 gate 8 stands at its normal fifty volts negative and the anode 10 is at substantially fifty volts positive and the cathode 11 is at substantially fifty volts negative, the signals on outgoing channel 1 will be limited by the diode 12 to no more than fifty volts positive and by diode 14 to no less than fifty volts negative.

What is claimed is:

1. In a signaling system, an incoming channel connected in multiple to a first outgoing channel and a second outgoing channel, means connected to the said first outgoing channel to selectively ground said first channel, means synchronized with the transmission of signals from said incoming channel constituting outgoing signals for said second outgoing channel for selectively operating the grounding means for said first channel, and means connected to said second outgoing channel to selectively ground said second channel, and means synchronized with the transmission of signals from said incoming channel constituting outgoing signals for said first outgoing channel for selectively operating the grounding means for said second channel.

2. In a signaling system, an incoming channel connected in multiple to a first outgoing channel and a second outgoing channel, a high resistance element in each said outgoing channel at the junction thereof with said incoming channel for preventing the grounding of either outgoing channel from attenuating signals in the other one thereof, means connected to the said first outgoing channel to ground said channel over periods synchronized with the transmission of signals from said incoming channel constituting outgoing signals for said second outgoing channel, and means connected to said second outgoing channel to ground said channel over periods synchronized with the transmission of signals from said incoming channel constituting outgoing signals for said first outgoing channel.

3. In a signaling system, an incoming channel connected in multiple to a first outgoing channel and a second outgoing channel, a high resistance element in each said outgoing channel at the junction thereof with said incoming channel for preventing the attenuation of a signal in either by the grounding of the other, means connected to each of said outgoing channels to attenuate therein signals transmitted from said incoming channel into both said outgoing channels and constituting signals for the other of said outgoing channels, said means consisting of a tube circuit normally limiting signals between a given positive potential and a given negative potential, a source of pulses timed to synchronize with signals for the other of said outgoing channels and control connections from said synchronizing source to said tube circuit to change said positive limiting potential to a zero limiting potential and said negative limiting potential to a zero limiting potential.

4. In a signaling system, an incoming channel for transmitting time division multiplexed signals of varying potential amplitudes connected in multiple to a first outgoing channel and a second outgoing channel, a high resistance element in each said outgoing channel at the junction thereof with said incoming channel for preventing the attenuation of a signal in either by the grounding of the other, means connected to each of said outgoing channels to attenuate therein signals transmitted from said incoming channel into both said outgoing channels and constituting signals for the other of said outgoing channels, said means consisting of a forwardly poled diode connected to the anode of a first tube and a backwardly poled diode connected from said tube anode to ground and a similar network consisting of a backwardly poled diode connected to the cathode of a second tube and a forwardly poled diode connected from said cathode to ground, and a source of synchronizing pulses connected to the grids of said tubes normally held at a negative potential to cause minimum conduction in both said tubes and bearing pulses of zero potential to cause corresponding intervals of maximum conduction in both said tubes.

5. In a signaling system, an incoming channel for transmitting time division multiplexed signals for varying potential amplitudes connected in multiple to two outgoing channels, a high resistance element in each said outgoing channel at the junction thereof with said incoming channel for preventing the attenuation of a signal in either by the grounding of the other and means operating at the periodicity of said time division multiplexed signals for alternately grounding each of said outgoing channels.

References Cited in the file of this patent

UNITED STATES PATENTS

| | | |
|---|---|---|
| 2,531,600 | Barney et al. | Nov. 28, 1950 |
| 2,790,900 | Feissel | Apr. 30, 1957 |